(12) United States Patent
Edwardson et al.

(10) Patent No.: US 7,509,416 B1
(45) Date of Patent: Mar. 24, 2009

(54) DYNAMICALLY UPDATING SUBCOMPONENTS IN A TIERED REMOTE MONITORING SYSTEM

(75) Inventors: David J. Edwardson, Shoreview, MN (US); Shinji Muro, New Brighton, MN (US); Kate H. Tsai, Brooklyn Park, MN (US); Tyson R. Midboe, Bloomington, MN (US)

(73) Assignee: Unisys Corporation, Blue Bell, PA (US)

( * ) Notice: Subject to any disclaimer, the term of this patent is extended or adjusted under 35 U.S.C. 154(b) by 327 days.

(21) Appl. No.: 11/592,669

(22) Filed: Nov. 3, 2006

(51) Int. Cl.
*G06F 15/173* (2006.01)

(52) U.S. Cl. ............................... 709/224; 709/226

(58) Field of Classification Search .............. 709/224, 709/226
See application file for complete search history.

(56) References Cited

U.S. PATENT DOCUMENTS

| | | | |
|---|---|---|---|
| 6,122,664 A * | 9/2000 | Boukobza et al. | 709/224 |
| 7,409,676 B2 * | 8/2008 | Agarwal et al. | 717/120 |
| 2003/0046396 A1 * | 3/2003 | Richter et al. | 709/226 |
| 2005/0192969 A1 * | 9/2005 | Haga et al. | 707/10 |
| 2007/0169167 A1 * | 7/2007 | Morimura et al. | 726/1 |
| 2008/0141261 A1 * | 6/2008 | Machida | 718/104 |

* cited by examiner

*Primary Examiner*—Patrice Winder
*Assistant Examiner*—Minh-Chau Nguyen
(74) *Attorney, Agent, or Firm*—James E. Goepel; Beth L. McMahon

(57) ABSTRACT

Various approaches for updating system monitoring policy parameters. In one approach, updates to the monitoring policy parameters are transmitted to an event server via an event report. The event server transmits the event report to a subcomponent manager executing on the monitored system. The subcomponent manager determines to which of a plurality of monitoring subcomponents the update is to be applied. The subcomponent manager then suspends the execution thread of the monitoring subcomponents, updates monitoring policy parameters of the subcomponent with data from the event report, and thereafter resumes the execution thread of the subcomponents. The subcomponent then operates with the updated monitoring policy parameters.

11 Claims, 4 Drawing Sheets

DYNAMICALLY UPDATING SUBCOMPONENTS IN A TIERED REMOTE MONITORING SYSTEM

FIELD OF THE INVENTION

The present invention generally relates to remotely and dynamically updating subcomponents that monitor a target system's resources.

BACKGROUND

System monitoring applications are used to monitor the operational status of the resources made available in a target system. Monitored system resources include CPU, disk, and memory utilization, and application or process status, for example. By monitoring the status of system resources, an operator may take preemptive corrective action and thereby possibly avoid a serious system failure.

Remote monitoring of the status of a system's resources may be implemented out of a desire to consolidate the operations of multiple systems into a single location. In remote monitoring, a system's status information is transmitted via a network (local area or wide area) to a workstation, for example, and displayed thereon. In some monitoring arrangements, software on a single workstation can display the status information of multiple target systems and also provide an interface for operating the target systems. The Operations Sentinel software from Unisys is an example package that provides such monitoring and operations capabilities for multiple target systems. By consolidating the monitoring and operations of multiple systems on a single workstation it is possible for a single user to operate multiple systems from a single location.

During the course of operating a computing arrangement it may be desirable to change the conditions under which status information is reported for various resources, enable a new software component for monitoring additional resources, or remove a current software component when monitoring of a resource is no not longer desired. As new applications are added to the system and new users draw on the system's resources, for example, the operational status of the system may become more critical and administrators may desire more advanced warning of approaching resource shortages.

Changing the parameters involved in monitoring a system, however, may be burdensome and present undesirable risks. In order to change the monitoring capabilities in some systems it may be necessary to stop a monitoring program, change the operational parameters, and thereafter restart the program. However, restarting a monitoring program on the target system may be time-consuming. Furthermore, during the time it takes to restart the monitoring program, important status information may be lost, and the opportunity to take remedial action may have passed.

A method and system that address these and other related issues are therefore desirable.

SUMMARY

The various embodiments of the invention provide methods and systems for updating system monitoring parameters for at least one monitored system. In one embodiment, a method is provided. The method includes receiving a set of updated monitoring parameter values by a subcomponent manager executing on a monitored system; stopping an execution thread that executes a monitoring subcomponent on the monitored system, wherein the subcomponent manager stops the execution thread responsive to the received set of updated monitoring parameter values; updating, by the subcomponent manager, parameters used by the monitoring subcomponent with the set of updated monitoring parameter values; and restarting the execution thread of the monitoring subcomponent by the subcomponent manager, wherein the monitoring subcomponent monitors status of the monitored system with the set of updated monitoring parameter values upon restarting of the execution thread.

In another method, an event server is used to relay updates. This method comprises transmitting a first policy update event report from a configuration tool to an event server in response to user input data that specifies the policy update, wherein the configuration tool is coupled to the event server via a network; transmitting the first policy update event report from the event server to a subcomponent manager in response to the subcomponent manager having registered to receive a policy update event report, wherein the subcomponent manager executes on the monitored system and is coupled to the event server via a network; in response to receipt of the first policy update event report by the subcomponent manager, determining a first one of a plurality of subcomponents for which the policy update is to be applied, each subcomponent having a respective execution thread on the monitored system and configured to monitor status of the monitored system, suspending the execution thread of the first one of the subcomponents, updating monitoring policy parameters of the first one of the subcomponents with data from the first policy update event report, and resuming the execution thread of the first one of the subcomponents after updating the policy data; transmitting a system status event report from the first one of the subcomponents to the event server in response to violation of the monitoring policy parameters detected by the first one of the subcomponents; and transmitting the system status event report from the event server to a display tool, wherein the display tool is coupled to the event server via a network.

A system for updating system monitoring policy parameters for at least one monitored system is provided in another embodiment. The system comprises a configuration utility configured to generate, while executing on a first data processing system, a first policy update event report in response to user input data that specifies the policy update; an event server coupled to the configuration utility via a network, wherein the configuration utility is configured to transmit the first policy update event report to the event server; a subcomponent manager coupled to the event server, the subcomponent manager configured to register, while executing on the monitored system, with the event server to receive policy update event reports, wherein the event server is configured to transmit the first policy update event report to the subcomponent manager in response to the subcomponent manager having registered to receive policy update event reports; a plurality of monitoring subcomponents coupled to the subcomponent manager, each monitoring subcomponent configured to monitor operating status of the monitored system under a respective execution thread on the monitored system, wherein the subcomponent manager is further configured to determine a first one of the plurality of subcomponents for which the policy update is to be applied, suspend the execution thread of the first one of the subcomponents, update policy data of the first one of the subcomponents with data from the first policy update event report, and resume the execution thread of the first one of the subcomponents after updating the policy data. The first one of the subcomponents is configured to transmit a system status event report to the event server in response to violation of the policy data detected by the first one of the subcomponents, and the event server is further configured to transmit the system status event report to a display tool, wherein the display tool is coupled to the event server via a network.

An apparatus for updating system monitoring policy parameters for at least one monitored system is provided in another method. The apparatus comprises means for transmitting a first policy update event report from a configuration tool to an event server in response to user input data that specifies the policy update, wherein the configuration tool is coupled to the event server via a network; means for transmitting the first policy update event report from the event server to a subcomponent manager in response to the subcomponent manager having registered to receive a policy update event report, wherein the subcomponent manager executes on the monitored system and is coupled to the event server via a network; means, responsive to receipt of the first policy update event report by the subcomponent manager, for determining a first one of a plurality of subcomponents for which the policy update is to be applied, each subcomponent having a respective execution thread on the monitored system and configured to monitor status of the monitored system, for suspending the execution thread of the first one of the subcomponents, for updating monitoring policy parameters of the first one of the subcomponents with data from the first policy update event report, and for resuming the execution thread of the first one of the subcomponents after updating the policy data; means for transmitting a system status event report from the first one of the subcomponents to the event server in response to violation of the monitoring policy parameters detected by the first one of the subcomponents by the monitored system; and means for transmitting the system status event report from the event server to a display tool, wherein the display tool is coupled to the event server via a network.

Another apparatus for updating system monitoring parameters for at least one monitored system comprises means for receiving a set of updated monitoring parameter values by a subcomponent manager executing on a monitored system; means for stopping an execution thread that executes a monitoring subcomponent on the monitored system, wherein the subcomponent manager stops the execution thread responsive to the received set of updated monitoring parameter values; means for updating, by the subcomponent manager, parameters used by the monitoring subcomponent with the set of updated monitoring parameter values; means for restarting the execution thread of the monitoring subcomponent by the subcomponent manager, wherein the monitoring subcomponent monitors status of the monitored system with the set of updated monitoring parameter values upon restarting of the execution thread.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
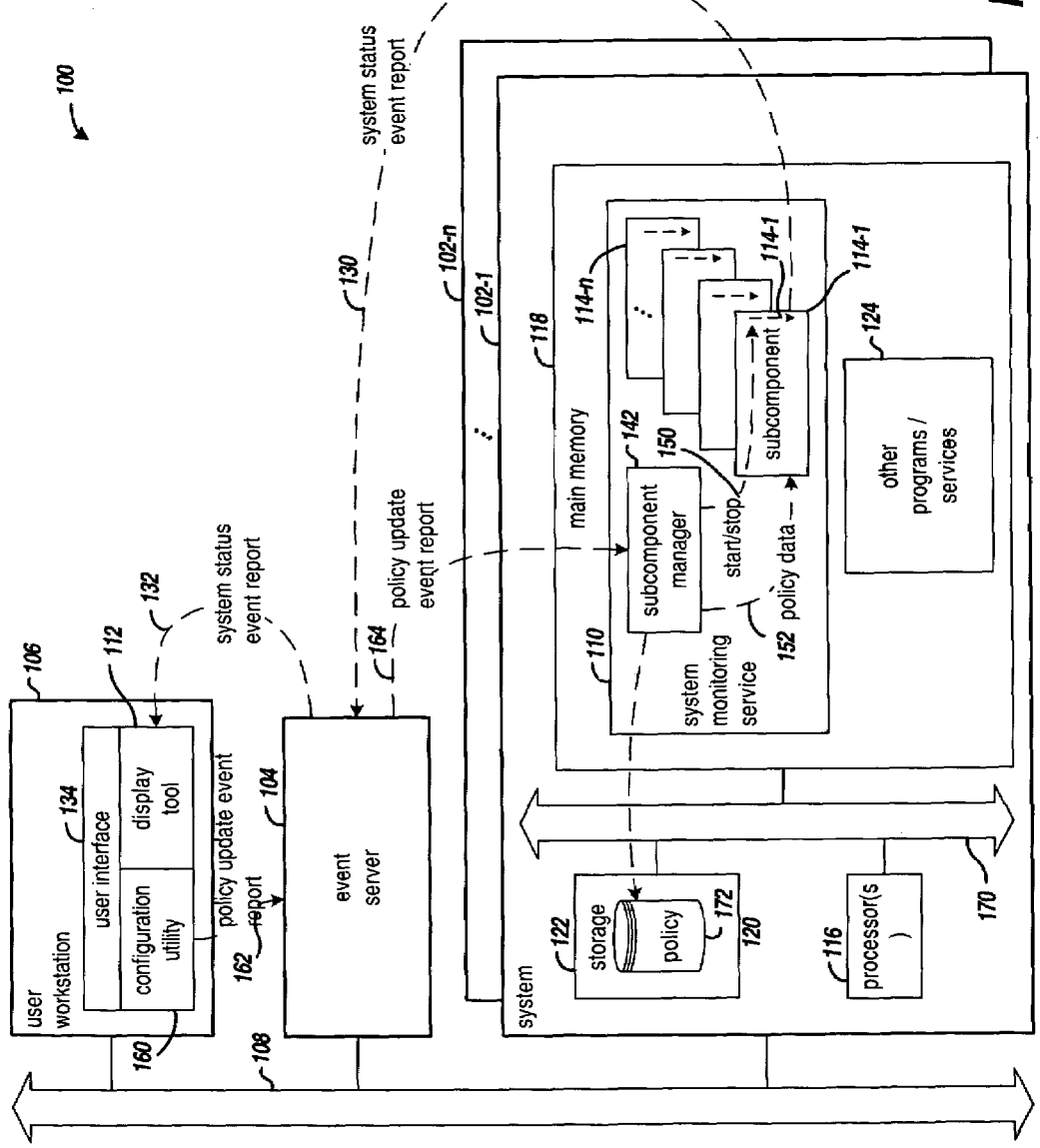
FIG. 1 is a block diagram of an example tiered computing arrangement in which one or more embodiments of the invention may be implemented.

FIG. 1 is a block diagram of an example tiered computing arrangement 100 in which one or more embodiments of the invention may be implemented. The arrangement generally includes one or more systems 102-1-102-n to be monitored, an event server 104, and a user workstation 106. The systems, event server, and user workstation are coupled to a network 108. From the user workstation the operational status of systems 102-1-102-n may be monitored. Based on the reported status information a user may initiate corrective action on a system if the reported status information indicates that the system requires attention. From the following description it will be recognized that the event reporting services provided by event server 104 are used for both the reporting of operational status information of the monitored systems 102-1-102-n and for managing the configuration of the tools used to monitor the systems. In an effort to minimize the disruption to the monitoring of the systems, activation, deactivation, and operating parameters of the monitoring subcomponents are controlled with event reports transmitted via the event server.

The operational status of the systems 102-1-102-n is gathered by a system monitoring service 110 that executes on each of the monitored systems, and the status information is reported to a display tool 112 that executes on the workstation 106. The mechanism by which the status information is reported is via event reports. The display tool registers with the event server to receive event reports of a particular type designated in the registration request or from a particular system designated in the registration request.

The system monitoring service on each of the monitored systems includes a number of subcomponents 114-1-114-n. Each subcomponent is a software module that monitors and reports on the status of a resource of the system on which the subcomponent executes, for example, processor 116, memory 118, or disk storage 122 utilization. In addition, the status of other programs or services 124 executing on the system may be monitored. If a subcomponent determines that the status of the monitored resource violates a monitoring policy as set forth in by a configured parameter value, the subcomponent generates a system status event report and transmits the event report (line 130) to the event server 104. In response to receiving an event report, the event server determines the component(s) that have registered to receive event reports of the event report type specified at registration. Example event report types include ALERT, LOG, and CONTROL PACKET, for example. The specific types of event reports are implementation dependent. The event server then transmits the event report (line 132) to the identified component(s). In the example arrangement 100, the display tool 112 registers with the event server to receive the event reports of a particular type, and information from the event report is output to a user via user interface 134, for example, in the form of information displayed on a video terminal, audible alarms, or electronic messaging such as emails, pages, or instant messaging.

In addition, the event reporting structure and processes are used to channel updates to the subcomponents. In order to provide operational flexibility and to minimize the impact on the monitoring of system status, respective threads are initiated for the subcomponents so that the updating of the operational parameters of one component will not impact the operations of others of the subcomponents. This allows the user to update status monitoring policy and also start and stop the monitoring of the monitored resources without interrupting the monitoring of other resources.

A subcomponent manager 142 executes as part of the system monitoring service. The subcomponent manager controls the starting and stopping (line 150) of a separate execution thread (e.g., 144-1) for each of the subcomponents 114-1-114-n. Those skilled in the art will recognize that various operating systems provide support for application programs or services with multiple threads of execution. Generally, to apply updated operating parameters or "policy data" to a subcomponent, the subcomponent manager stops the thread that executes that subcomponent, updates the operating parameters for that subcomponent (line 152) with the values from the policy update event report, and then restarts the thread. Use of separate threads allows the other subcomponents to continue monitoring system status and report status information without interruption from the updating of the policy data for another of the subcomponents.

The subcomponent manager registers with the event server to receive policy update event reports, and a configuration utility 160 executes on the workstation to provide the policy update event reports in response to user input.

The configuration utility provides a user interface for updating the policy data of the subcomponents 114-1-114-n. In one embodiment, a separate window may be provided to update the monitoring policy for each of the different types of resources that are monitored. In addition, the monitoring policy data may be updated for monitoring a single system, or the monitoring policy data may be applied to the all the systems 102-1-102-n. The configuration tool provides the user with the ability to change the policy on all the systems at once rather than having to update the policies individually.

To update the monitoring policy data for a subcomponent, the configuration utility generates a policy update event report from the input data provided by the user. The policy update event report is transmitted to the event server (line 162), and the event server forwards that event report (line 164) to each subcomponent manager on each of the systems 102-1-102-n that has registered to the policy update receive reports. The subcomponent manager reads the policy data from the event report and writes that data to data structures (not shown) used by the subcomponent for storage of its operating parameters. In addition, the policy data is written to a file/database 172 in persistent storage 122. In one embodiment, a single policy update event report includes all information about all monitoring resource components. The subcomponent manager determines which subcomponents are affected by the change in policy data from the data in the policy update event reports and updates the policy data for each individual subcomponent as needed.

The systems 102-1-102-n may be any type of data processing system for which remote monitoring is desired. A bus arrangement 170 including a single or a hierarchical arrangement of buses intercouple the memory, processor(s), I/O, and storage. The event server provides the communications channel through which the configuration utility on the workstation communicates with the subcomponent manager. In the example embodiment, the event server includes one or more data processing systems on which software executes to provide the event serving functions. The particular data processing system may be of any class suitable to provide the event serving functions in combination with any additional functions that are desired. The user workstation 106 may be any data processing suitable for hosting the display tool and configuration utility and providing user interface capabilities including at least a graphical user interface (GUI). The particular computer hardware and operating systems of the systems 102-1-102-n, event server 104, and workstation 106 depend on the service needs of the user community that relies on the arrangement 100. For example, in one arrangement, systems 102-1-102-n would provide file, communications, and/or computing services to an organization, event server provides the event channel and possibly other IT support services, and the workstation may be a desktop system or even a notebook system.

Figure 2:
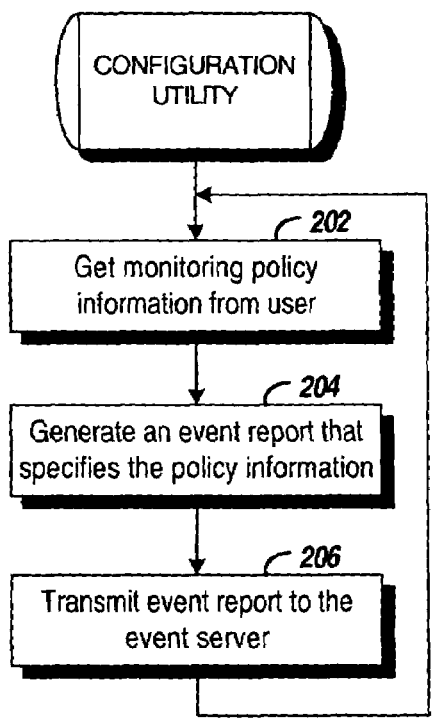
FIG. 2 is a flowchart of a process performed by a configuration utility in accordance with one or more embodiments of the invention.

FIG. 2 is a flowchart of a process performed by a configuration utility in accordance with one or more embodiments of the invention. The process generally entails obtaining monitoring policy information from a user (step 202), generating a policy update event report (step 204), and transmitting the event report to the event server (step 206).

The policy information gathered from the user depends on the system resources being monitored. In an example embodiment, respective monitoring subcomponents are configured to monitor programs and services, disk drives utilization, various event logs, memory utilization, and processor utilization. The user interface 134 (FIG. 1) provides a GUI, for example, for enabling and disabling the different monitoring subcomponents and for entering the monitoring policy (operational parameters) for the monitoring subcomponents. For monitoring programs and services, the user is provided with the ability to specify whether the subcomponent is to monitor for the program/service being active but non-responsive, and to monitor for whether the program/service is running or not running. In response to detecting the specified status, the subcomponent generates an event report and transmits the event report to the event server.

Via the interface 134 the user may also specify a monitoring policy for disk drives of the system. The user may specify a particular name(s) of a disk drive(s) to monitor, and specify a threshold value at which the subcomponent is to generate an event report. The threshold value is selectable by the user as either a percentage or an absolute value of the quantity of resource currently in use. When the subcomponent detects that disk usage for the specified disk exceeds the threshold, an event report that describes the status is generated and sent to the event server.

Different event log files on the monitored system may be monitored according to user selection via the user interface 134. Example event logs include those used by applications and the system, as well as security event logs. As recognized by those skilled in the art, a program may write data to an event log to make a record of an event that occurred during execution of the program and that may be of interest for subsequent analysis. The user may specify the types of events to monitor according to the different types in the event log. Example log event types include warnings informational, successful audit and failure audit type log events. The subcomponent may also monitor for events from a user-selected source. In response to finding an event in the event log that matches the monitoring policy, the subcomponent generates an event report that contains the entry from the event log and sends the event report to the event server.

A memory monitoring subcomponent is available for a user to specify the monitoring policy. The monitoring policy allows the user to specify a threshold value of memory utilization. If usage of memory in the system exceeds this percentage amount, the subcomponent generates an event report that indicates this status and sends the event report to the event server.

A user may specify the monitoring policy for a processor monitoring subcomponent in a manner similar to that by which the monitoring policy is specified for the memory monitoring subcomponent. The user may specify a threshold value of processor utilization, and if the subcomponent detects that processor utilization exceeds this threshold an event report is generated and sent to the event server.

In another embodiment, the user may specify that the monitoring policy be applied to one or more selected systems. In situations where there are a large number of systems being monitored, this allows the user to propagate the policy with a single action rather than having to specify the same policy multiple times for all the systems. In one embodiment, data in the event report signals to the event server to transmit the event report to the subcomponent managers on all the monitored systems.

Figure 3:
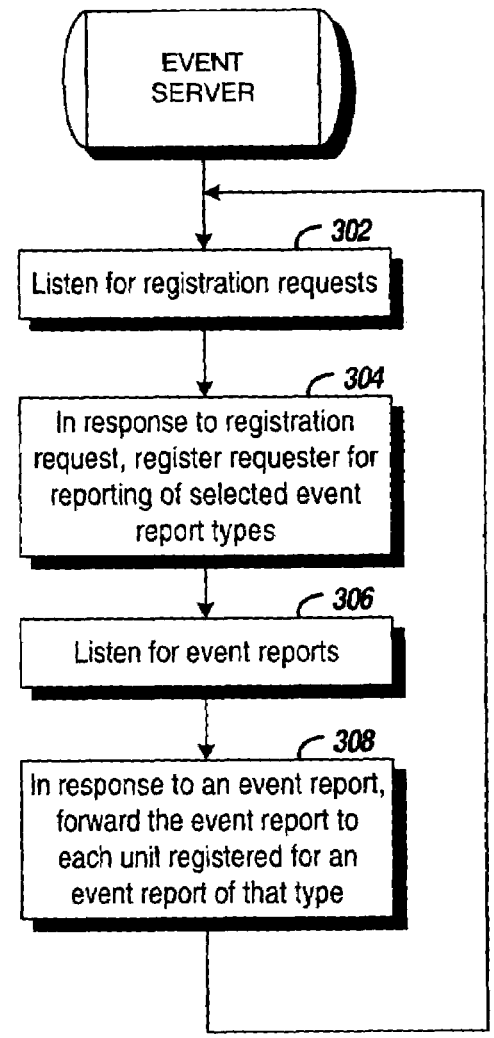
FIG. 3 is a flowchart of a process performed by an event server in accordance with one or more embodiments of the invention.

FIG. 3 is a flowchart of a process performed by an event server in accordance with one or more embodiments of the invention. The process generally entails registering components that have requested to receive certain types of event reports, receiving event reports of various types, and distributing the event reports to the components based on the types of event reports the components have registered to receive.

The event server listens for registration requests on a socket, for example (step 302). In response to a registration request, the event server registers the requester for reporting of the types of event reports specified in the registration request (step 304). In an example embodiment, the event server maintains a table that contains the identifier of each registered requester and the associated type(s) of event reports that that requester is to receive. For example, the type of sender may be the type of the configuration utility, and the registering receiver is the subcomponent manager. The event server maintains a socket connection with each registered requester.

Components that transmit event reports to the event server also register with the event server, and the event server listens for event reports on sockets used to receive event reports from those components (306). In response to an event report, the event server determines each component that has registered to receive an event report of the type received and forwards the event report to the identified component(s) via the socket maintained for that component (step 308).

Figure 4:
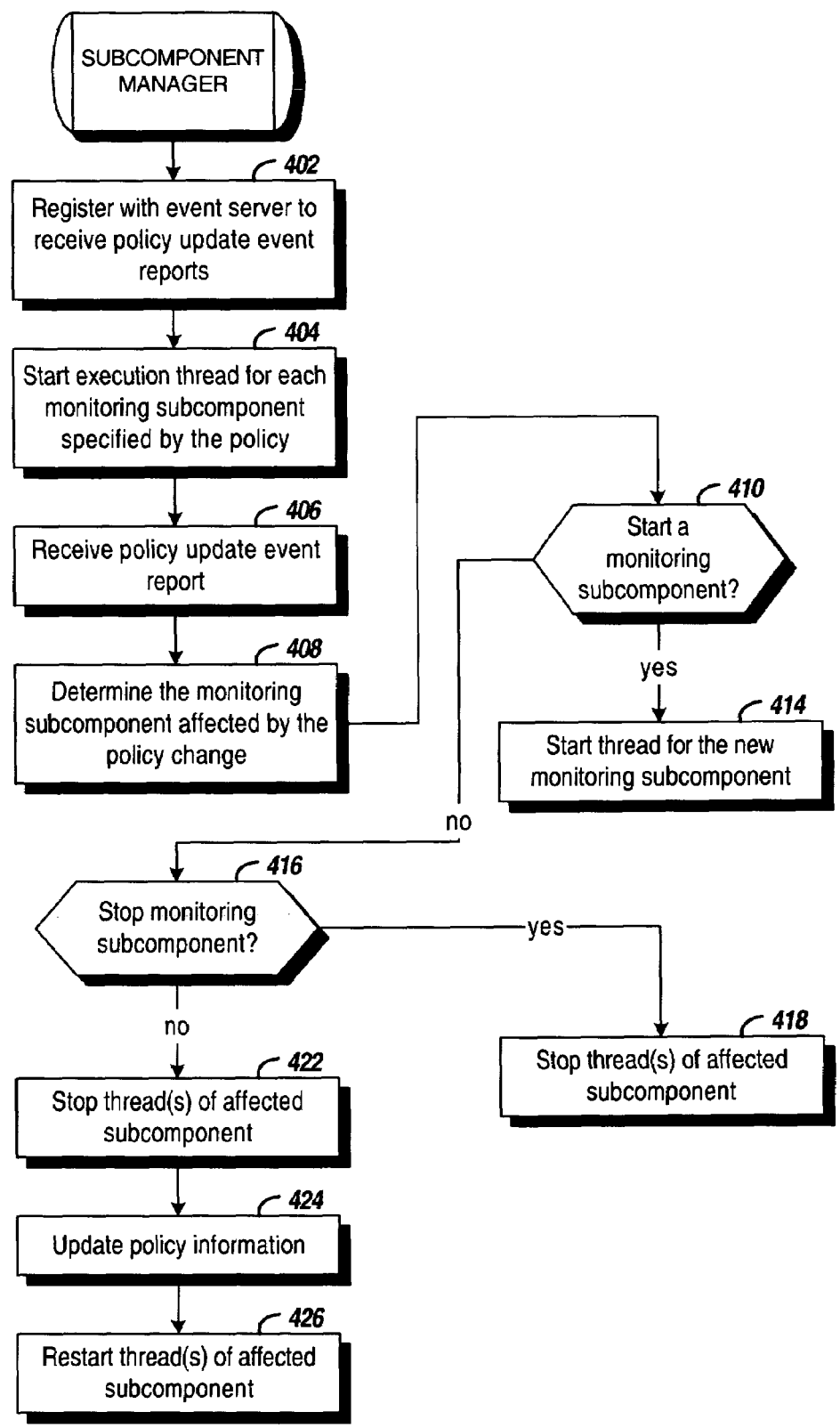
FIG. 4 is a flowchart of a process performed by a subcomponent manager in accordance with one or more embodiments of the invention.

FIG. 4 is a flowchart of a process performed by a subcomponent manager in accordance with one or more embodiments of the invention. The subcomponent manager executes as part of the monitoring service on the system being monitored and controls the starting, stopping, and monitoring policy of the monitoring subcomponents.

The subcomponent manager registers with the event server to receive policy update event reports (step 402). For each monitoring subcomponent specified by the monitoring policy, a respective execution thread is started (step 404). The monitoring policy may be a current or default policy as saved in persistent storage. The separate threads for the different monitoring subcomponents allows a user to update the monitoring policy of one subcomponent without impacting the monitoring underway by others of the subcomponents.

In response to receiving a policy update event report (step 406), the subcomponent manager determines the subcomponent affected by the policy change (step 408). The affected subcomponent may be determined from the data contained in the event report. For example, if the policy for the disk monitoring subcomponent is to be changed, the event report will specify a disk identifier and a threshold value, which indicates that the disk monitoring subcomponent is to be updated. The policy update may be to start or stop a subcomponent or to update the operating parameters of a subcomponent.

If the event report indicates that a monitoring subcomponent is to be started (decision step 410), then the thread is started for the monitoring subcomponent (step 414), for example, via an operating system call. If the policy update event reports specifies that a monitoring subcomponent is to be stopped (decision step 416), the thread of the affected subcomponent is stopped (step 418) via a system call, for example.

If the event report calls for neither starting nor stopping a monitoring subcomponent, then the policy update event report is for updating operating parameters of the monitoring subcomponent. The subcomponent manager stops the thread of the affected subcomponent (step 422), updates the policy information for the subcomponent (step 424), and restarts the thread of the affected subcomponent (step 426). In one embodiment, the subcomponent manager updates the monitoring policy data of the subcomponent by writing to a data structure that is used by that subcomponent. Upon restarting of the subcomponent thread, the new monitoring policy data is read by the subcomponent and used to determine whether to generate a system status event report as described below. For a policy update event report that has specified its application across all monitored systems, for example, for enabling/disabling the monitoring of systems as opposed to updating a policy for a particular monitoring subcomponent, the subcomponent manager on each of the monitored systems stops all the execution threads for all the monitoring subcomponents so that the entire set of policy data can be updated. The threads are thereafter restarted.

Figure 5:
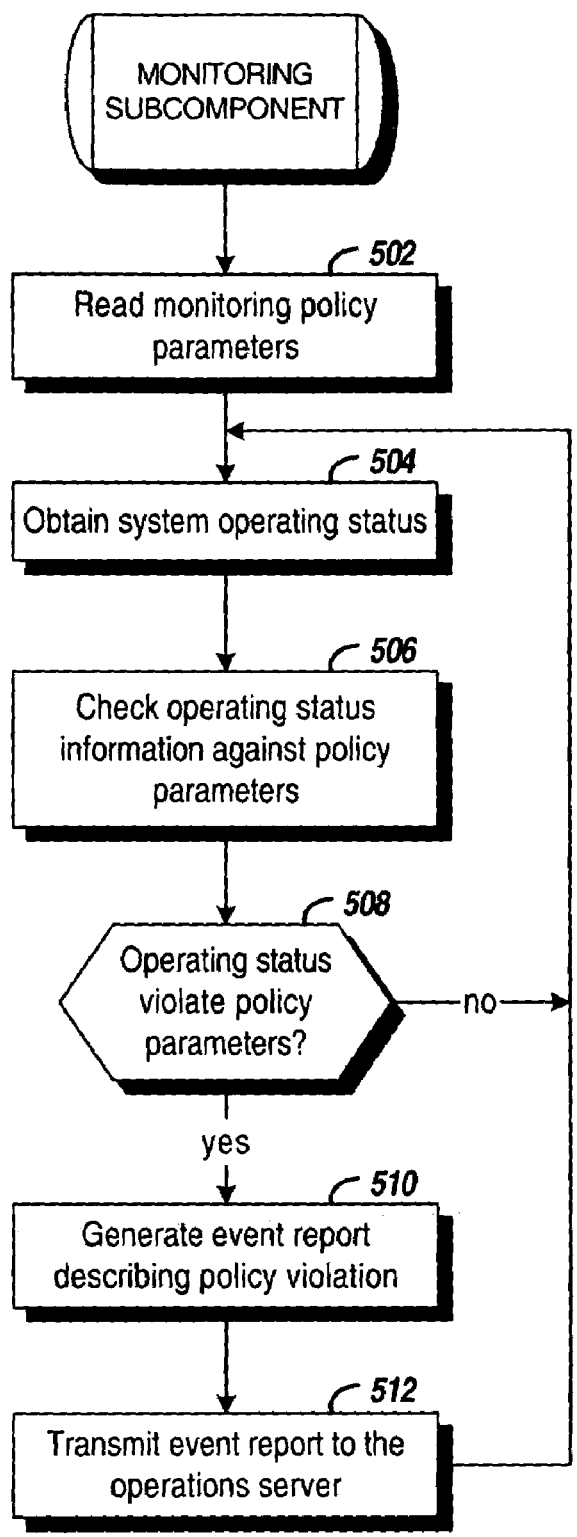
FIG. 5 is a flowchart of a process performed by a monitoring subcomponent in accordance with one or more embodiments of the invention.

FIG. 5 is a flowchart of a process performed by a monitoring subcomponent in accordance with one or more embodiments of the invention. Each monitoring subcomponent that monitors a different resource follows this same general process flow. The differences in the processing of each subcomponent is in the gathering of information for determining whether the system status is in compliance with the monitoring policy.

At initiation (when a thread is started for the subcomponent), a monitoring subcomponent reads the monitoring policy parameter values (step 502) that are established by the subcomponent manager. It will be appreciated that after a thread is stopped and then restarted, the thread begins execution with reading the monitoring policy parameter values at step 502. The parameter values may be read from a data structure that is populated with data by the manager, with the data being taken from persistent storage or from policy update event reports from a configuration tool.

The subcomponent then proceeds to gather from the system information indicative of the operating status (step 504). In the example embodiment, each subcomponent gathers the information needed for its monitoring. For example, one subcomponent will make system calls to determine the operational status of monitored programs and services, another will make system calls to gather information that indicates disk drive utilization, another subcomponent will read data from various event log files, and other subcomponents will make system calls to read the current processor and memory utilization levels.

The operating status information is then compared against the policy parameter values for the monitored resource (step 506). For example, data read from the event log file is compared to the type of event log entries to be reported. For memory and processor monitoring subcomponents, the current utilization level is compared against the policy threshold values, and a damping algorithm is applied to disregard any transient spikes in utilization.

If the operating status violates the policy parameter values (decision step 508), then a system status event report is generated to describe the event (step 510). For example, if the policy threshold value used in monitoring disk drive D is an absolute value of 300 GB and the system status is that 320 GB of storage is used, then the system status is in violation of the policy and an event report is generated. The event report is then transmitted to the event server (step 512), and control is returned to again obtain system status information (step 504). In another embodiment, a monitoring subcomponent may also send an event report when the status returns to a state that does not violate the policy (not shown).

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for updating system monitoring policy parameters for at least one monitored system, comprising:
    transmitting a first policy update event report from a configuration tool to an event server in response to user input data that specifies the policy update, wherein the configuration tool is coupled to the event server via a network;
    transmitting the first policy update event report from the event server to a subcomponent manager in response to the subcomponent manager having registered to receive a policy update event report, wherein the subcomponent manager executes on the monitored system and is coupled to the event server via a network;
    in response to receipt of the first policy update event report by the subcomponent manager,
        determining a first one of a plurality of subcomponents for which the policy update is to be applied, each subcomponent having a respective execution thread on the monitored system and configured to monitor status of the monitored system,
        suspending the execution thread of the first one of the subcomponents,
        updating monitoring policy parameters of the first one of the subcomponents with data from the first policy update event report, and
        resuming the execution thread of the first one of the subcomponents after updating the policy data;
    transmitting a system status event report from the first one of the subcomponents to the event server in response to violation of the monitoring policy parameters detected by the first one of the subcomponents; and
    transmitting the system status event report from the event server to a display tool, wherein the display tool is coupled to the event server via a network.

2. The method of claim 1, wherein two or more of the plurality of subcomponents monitor utilization of respective system hardware resources.

3. The method of claim 2, further comprising:
    transmitting a second policy update event report from the configuration tool to the event server in response to user input data that specifies to start a second one of the sub components;
    transmitting the second policy update event report from the event server to the subcomponent manager; and
    in response to receipt of the second policy update event report by the subcomponent manager, starting an execution thread for the second one of the subcomponents.

4. The method of claim 3, further comprising:
    transmitting a third policy update event report from the configuration tool to the event server in response to user input data that specifies to stop a third one of the subcomponents;
    transmitting the third policy update event report from the event server to the subcomponent manager; and
    in response to receipt of the third policy update event report by the subcomponent manager, stopping an execution thread for the third one of the subcomponents.

5. The method of claim 4, further comprising:
    transmitting a fourth policy update event report from a configuration tool to an event server in response to user input data that specifies the policy update and specifies a plurality of monitored systems;
    transmitting the fourth policy update event report from the event server to a plurality of subcomponent managers respectively executing on a plurality of monitored systems;
    in response to receipt of the fourth policy update event report by the plurality of subcomponent managers,
    suspending the execution thread of all the subcomponents on all of the monitored systems,
    updating policy data on all of the monitored systems with data from the fourth policy update event report, and
    resuming the execution threads of all of the subcomponents after updating the policy data.

6. The method of claim 5, wherein at least one of the plurality of subcomponents monitors data in an event log file.

7. The method of claim 1, further comprising:
    transmitting a second policy update event report from the configuration tool to the event server in response to user input data that specifies to start a second one of the subcomponents;
    transmitting the second policy update event report from the event server to the subcomponent manager; and
    in response to receipt of the second policy update event report by the subcomponent manager, starting an execution thread for the second one of the subcomponents.

8. The method of claim 7, her comprising:
    transmitting a third policy update event report from the configuration tool to the event server in response to user input data that specifies to stop a third one of the sub components;
    transmitting the third policy update event report from the event server to the subcomponent manager; and in response to receipt of the third policy update event report by the subcomponent manager, stopping an execution thread for the third one of the subcomponents.

9. The method of claim 8, further comprising:

transmitting a fourth policy update event report from a configuration tool to an event server in response to user input data that specifies the policy update and specifies a plurality of monitored systems;

transmitting the fourth policy update event report from the event server to a plurality of subcomponent managers respectively executing on a plurality of monitored systems;

in response to receipt of the fourth policy update event report by the plurality of subcomponent managers, suspending the execution thread of all the subcomponents on all of the monitored systems, updating policy data on all of the monitored systems with data from the fourth policy update event report, and resuming the execution threads of all of the subcomponents after updating the policy data.

10. A system for updating system monitoring policy parameters for at least one monitored system, comprising:

a configuration utility configured to generate, while executing on a first data processing system, a first policy update event report in response to user input data that specifies the monitoring policy parameters;

an event server coupled to the configuration utility via a network, wherein the configuration utility is configured to transmit the first policy update event report to the event server;

a subcomponent manager coupled to the event server, the subcomponent manager configured to register, while executing on the monitored system, with the event server to receive policy update event reports, wherein the event server is configured to transmit the first policy update event report to the subcomponent manager in response to the subcomponent manager having registered to receive policy update event reports;

a plurality of monitoring subcomponents coupled to the subcomponent manager, each monitoring subcomponent configured to monitor operating status of the monitored system under a respective execution thread on the monitored system, wherein the subcomponent manager is further configured to determine a first one of the plurality of subcomponents for which the policy update is to be applied, suspend the execution thread of the first one of the subcomponents, update monitoring policy parameters of the first one of the subcomponents with data from the first policy update event report, and resume the execution thread of the first one of the subcomponents after updating the monitoring policy parameters; and wherein the first one of the subcomponents is configured to transmit a system status event report to the event server in response to violation of the monitoring policy parameters detected by the first one of the subcomponents, and the event server is further configured to transmit the system status event report to a display tool, wherein the display tool is coupled to the event server via a network.

11. An apparatus for updating system monitoring policy parameters for at least one monitored system, comprising:

means for transmitting a first policy update event report from a configuration tool to an event server in response to user input data that specifies the policy update, wherein the configuration tool is coupled to the event server via a network;

means for transmitting the first policy update event report from the event server to a subcomponent manager in response to the subcomponent manager having registered to receive a policy update event report, wherein the subcomponent manager executes on the monitored system and is coupled to the event server via a network;

means, responsive to receipt of the first policy update event report by the subcomponent manager, for determining a first one of a plurality of subcomponents for which the policy update is to be applied, each subcomponent having a respective execution thread on the monitored system and configured to monitor status of the monitored system, for suspending the execution thread of the first one of the subcomponents, for updating monitoring policy parameters of the first one of the subcomponents with data from the first policy update event report, and for resuming the execution thread of the first one of the subcomponents after updating the policy data;

means for transmitting a system status event report from the first one of the subcomponents to the event server in response to violation of the monitoring policy parameters detected by the first one of the subcomponents by the monitored system; and means for transmitting the system status event report from the event server to a display tool, wherein the display tool is coupled to the event server via a network.

\* \* \* \* \*